(12) United States Patent
Ortmann et al.

(10) Patent No.: US 7,322,903 B2
(45) Date of Patent: Jan. 29, 2008

(54) CONTROL METHOD FOR COOLING A LAUNCH CLUTCH AND AN ELECTRIC MOTOR IN A HYBRID ELECTRIC VEHICLE POWERTRAIN

(75) Inventors: Walter Ortmann, Saline, MI (US); Marvin Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 187 days.

(21) Appl. No.: 11/276,378

(22) Filed: Feb. 27, 2006

(65) Prior Publication Data
US 2007/0202989 A1    Aug. 30, 2007

(51) Int. Cl.
*F16H 59/00* (2006.01)
(52) U.S. Cl. .................. 477/98; 477/5; 477/6
(58) Field of Classification Search ............. 477/3, 477/5, 6, 97, 98
See application file for complete search history.

(56) References Cited

U.S. PATENT DOCUMENTS

| | | | |
|---|---|---|---|
| 4,712,453 A | 12/1987 | Haley | |
| 5,023,789 A | 6/1991 | Lampe et al. | |
| 5,040,379 A * | 8/1991 | Fukunaga et al. | ............ 62/201 |
| 6,631,651 B2 | 10/2003 | Petrzik | |
| 6,715,597 B1 | 4/2004 | Buchanan et al. | |
| 6,736,228 B2 | 5/2004 | Donohue et al. | |
| 6,909,349 B1 * | 6/2005 | Longardner et al. | ............ 336/60 |
| 6,938,605 B2 * | 9/2005 | Al-Khateeb | ............ 123/196 AB |
| 2004/0112171 A1 | 6/2004 | Kuhstrebe et al. | |
| 2004/0159520 A1 | 8/2004 | Anwar et al. | |
| 2004/0159523 A1 | 8/2004 | Duan et al. | |

* cited by examiner

*Primary Examiner*—Ha D. Ho
(74) *Attorney, Agent, or Firm*—David B. Kelley; Brooks Kushman P.C.

(57) ABSTRACT

A method is for controlling a rate of flow of cooling oil to a friction launch clutch and electric motor in a hybrid electric vehicle powertrain. The rate of flow is determined by changes in clutch temperature and motor temperature. Cooling oil flow in excess of the flow required to maintain a desired temperature is avoided.

19 Claims, 3 Drawing Sheets

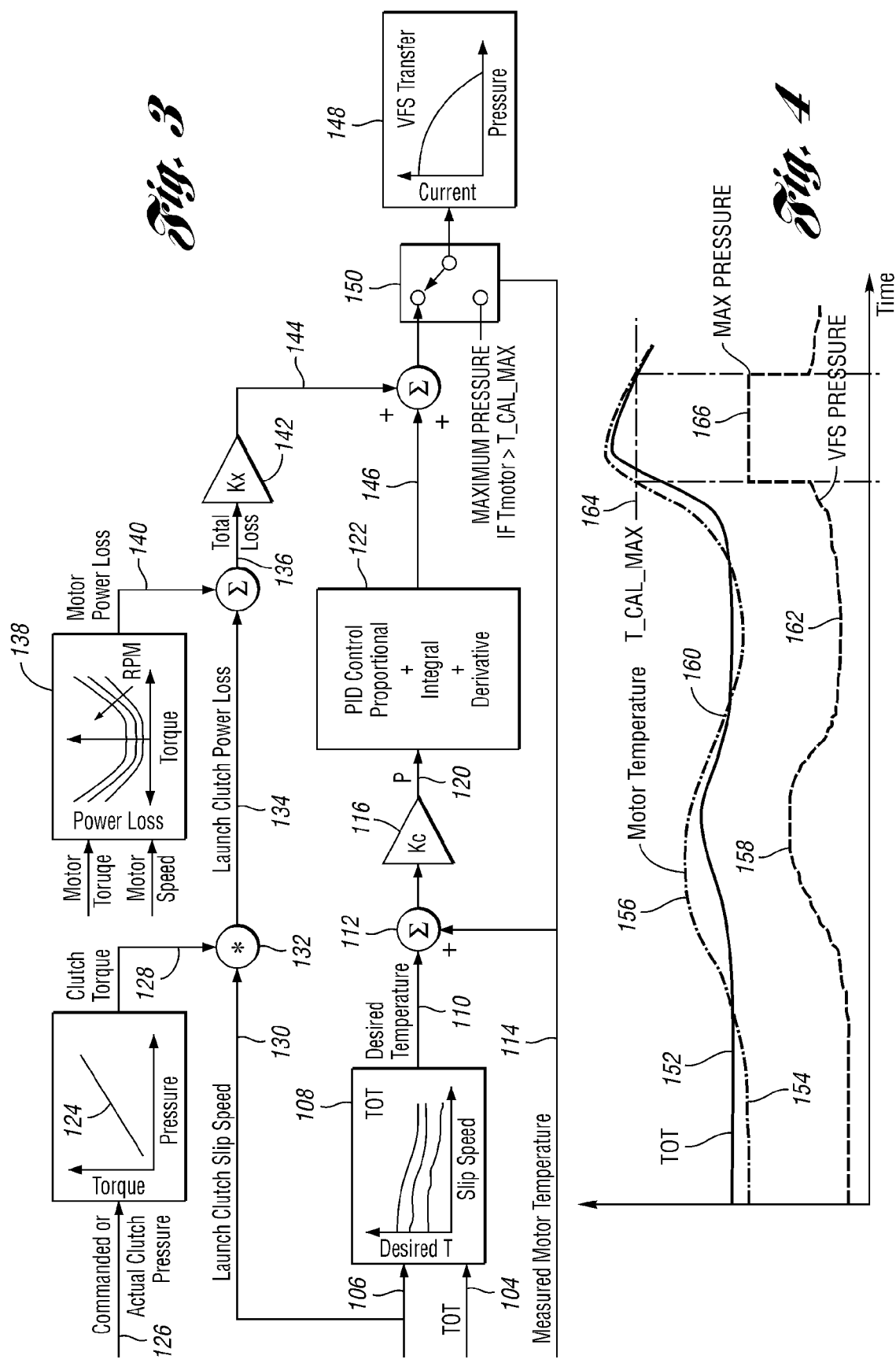

CONTROL METHOD FOR COOLING A LAUNCH CLUTCH AND AN ELECTRIC MOTOR IN A HYBRID ELECTRIC VEHICLE POWERTRAIN

BACKGROUND OF THE INVENTION

1. Field of the Invention

The invention relates to friction clutches for establishing and disestablishing torque flow paths in a hybrid electric vehicle powertrain.

2. Background Art

A hybrid electric vehicle powertrain with an internal combustion engine and a high voltage electric motor arranged in series is disclosed in U.S. Pat. No. 6,585,066. A powertrain of that type sometimes is referred to as a modular hybrid transmission when an electric motor portion of the powertrain and a discrete ratio transmission mechanism comprise separate modules that are integrated in a compact assembly capable of delivering driving torque through both an electromechanical torque flow path and a fully mechanical torque flow path. The torque capacity of one path supplements the torque capacity of the other. A fully electric driving torque flow path may be obtained using the motor solely.

In the powertrain disclosed in U.S. Pat. No. 6,585,066, the motor is in a pre-transmission arrangement in the assembly and the engine is connected through a damper to a disconnect clutch. The disconnect clutch is used to establish and disestablish torque flow from the engine to the input shaft of the discrete ratio transmission. A launch clutch connects the engine and the rotor of the electric motor to the input shaft of the transmission during a vehicle launch. The motor and the transmission are arranged to achieve engine stopping and starting modes, brake energy regeneration, an electric power boost for the engine and a fully electric drive.

In those instances when the engine is turned off, the motor can be used to drive the vehicle if the engine disconnect clutch is disengaged. When both clutches are engaged, the motor and the engine cooperate to deliver driving torque to the vehicle traction wheels through the transmission. When the launch clutch is used in this fashion, the clutch is allowed to slip when the vehicle speed is near zero. This will permit the engine to remain running if the engine is used as a power source, and it will permit the motor to continue turning when the motor is used as a power source.

During a launch, which is described in U.S. Pat. No. 6,974,402, dated Dec. 13, 2005, the launch clutch is controlled to effect a desired amount of slipping, which creates a substantial amount of thermal energy that must be dissipated. The dissipation of the thermal energy during launch requires the use of transmission cooling fluid. The cooling fluid must be supplied at very high flow rates during a launch event. Once the launch is complete, the launch clutch can be closed so that slippage is avoided. The clutch then does not create thermal energy that must be dissipated. Continued circulation of cooling fluid through the clutch assembly at this time is a waste of energy, which reduces the overall efficiency of the transmission.

Without knowledge of the actual oil temperature within the motor or the clutch, this clutch cooling fluid control heretofore has been done in an open loop fashion. To ensure robustness, the open loop control must be designed for a worst-case condition, which can cause it to be relatively inefficient when the operating conditions for the powertrain are normal and a high cooling flow rate is not needed. There is a need, therefore, for providing a more efficient control of cooling fluid flow.

SUMMARY OF THE INVENTION

One embodiment of the present invention can be applied to a transmission, such as that disclosed in co-pending U.S. patent application Ser. No. 11/078,089, filed Mar. 11, 2005. That co-pending application is assigned to the assignee of the present invention.

To maximize overall transmission efficiency, the cooling fluid flow rate is made variable and is controlled electronically using a closed loop, digital, microprocessor-based control system.

An embodiment of the present invention comprises a vehicle launch clutch disposed within the rotor of a high voltage electric motor. Lubrication fluid flow for the launch clutch is distributed to the rotor and the stator of the motor, such that the same fluid flows through both the clutch and the motor. A thermistor is located within the stator windings, or in close proximity to the stator windings, to measure motor temperature. A temperature reading by the thermistor is compared to a base transmission fluid temperature to develop a signal that can be used to control oil flow for cooling both the clutch and the motor. The temperature of the stator windings is used in executing the clutch and motor cooling control strategy to provide a signal feedback in a closed loop controller, thereby providing a more accurate control of the necessary flow rate for the cooling fluid.

The closed loop controller of the present invention uses transmission oil temperature and launch clutch slip speed to determine a desired motor temperature. The desired motor temperature then is compared to the measured motor temperature to determine an error. The error is input to an overall gain to develop a closed loop pressure signal that is distributed to a control element having proportional, integral and derivative (PID) characteristics, although a controller having fewer of these characteristics also could be used, depending upon a design choice.

The system of the present invention can determine heat generating losses using precalibrated motor loss data. That information is used in the system as a feed forward term to improve the flow control. The two major sources of heat are the losses in the slipping clutch and the motor efficiency loss.

To estimate power loss in the launch clutch, clutch torque is estimated from either the commanded clutch pressure or the actual clutch pressure based upon design parameters of the launch clutch. A clutch gain and offset is known and is used to calculate the estimated clutch torque. Clutch torque is multiplied by clutch slip to determine power loss in the clutch.

A speed sensor is used to measure motor speed, and motor torque is determined by observing the command to the motor controller. The system uses calibrated efficiency data for the motor to estimate the motor power loss. Motor power loss and clutch power loss are combined to provide an estimate of total power loss, which is converted to a pressure signal that is added to the closed loop pressure signal. This pressure value is distributed to a switch, which in turn distributes the signal to a variable force solenoid control element (VFS) with a calibrated transfer function, which converts the signal to a desired current. That current is distributed to an electro-hydraulic control system, which causes the cooling fluid flow to be proportional to the pressure output of the variable force solenoid.

If there exists an unusual condition that requires an increased flow due to detection of a very high motor temperature, the switch will interrupt the closed loop control flow rate and force the system to deliver maximum flow.

BRIEF DESCRIPTION OF THE DRAWINGS

FIG. 3 is a schematic drawing of a control system for developing a closed loop control of cooling fluid through the motor and clutch assembly; and FIG. 4 is a plot showing the effect of the variable control of cooling fluid flow rate as the transmission oil temperature changes during a given time interval.

DETAILED DESCRIPTION OF AN EMBODIMENT OF THE INVENTION

Figure 1:
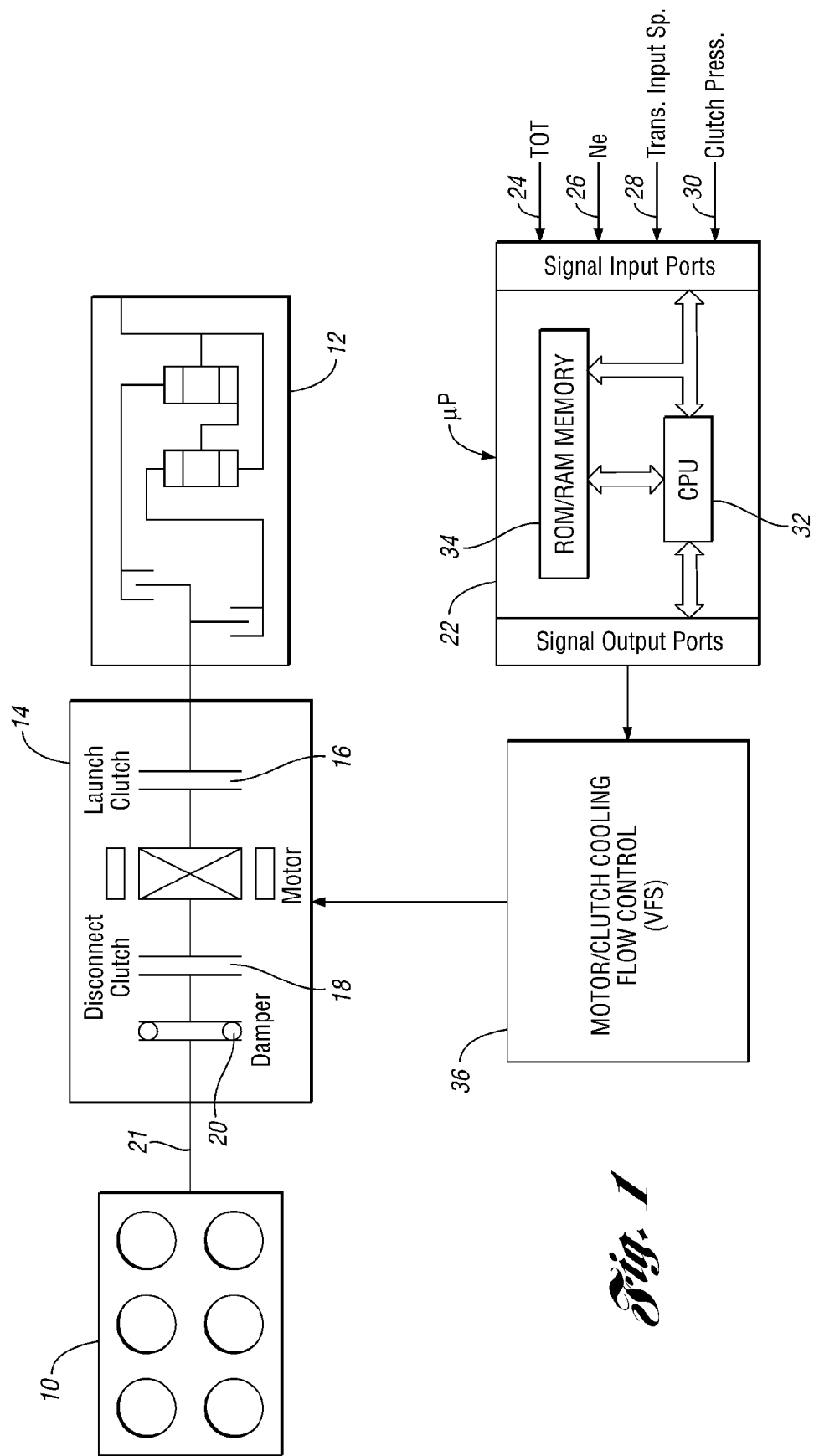
FIG. 1 is a schematic drawing of a modular hybrid transmission, which includes a disconnect clutch between a motor and an engine, and a launch clutch between a discrete ratio transmission and the motor.

In the schematic drawing of the powertrain of FIG. 1, an internal combustion engine is shown at 10 and a multiple ratio transmission is shown at 12. An electric motor, a disconnect clutch and a launch clutch form a part of a motor and clutch assembly 14. Assembly 14 is disposed in series relationship with respect to the transmission 12 as engine torque is delivered to vehicle traction wheels at the torque output side of the transmission 12.

The launch clutch for the assembly 14 of FIG. 1 is designated by reference numeral 16. A disconnect clutch for the assembly 14 is designated by reference numeral 18. A damper assembly, schematically shown at 20, is situated between an engine power output shaft 21 and the disconnect clutch 18.

A microprocessor 22, which will be described with reference to FIGS. 3 and 4, receives signals representing powertrain operating variables, which include transmission oil temperature 24, engine speed 26 and transmission input speed 28. It may receive also a clutch pressure signal at 30. The microprocessor 22 may be of conventional design with a central processing unit 32 and memory registers 34, including random access memory registers (RAM) and read-only memory registers (ROM). The input data is stored temporarily in the RAM portion of the memory. Control algorithms stored in ROM are executed by the central processing unit 32 (CPU), using data in RAM, to effect a VFS control signal distributed to a motor clutch cooling oil flow controller 36.

The microprocessor 22 may be designed to provide integrated control of the engine and the transmission, although distinct microprocessors instead could be used for separately controlling the engine and the transmission. The central processor unit 32 is in communication with the signal output ports and the signal input ports. It also is capable of reading data and executing algorithms stored in memory to develop signals distributed to the output ports for controlling cooling oil flow.

Figure 2:
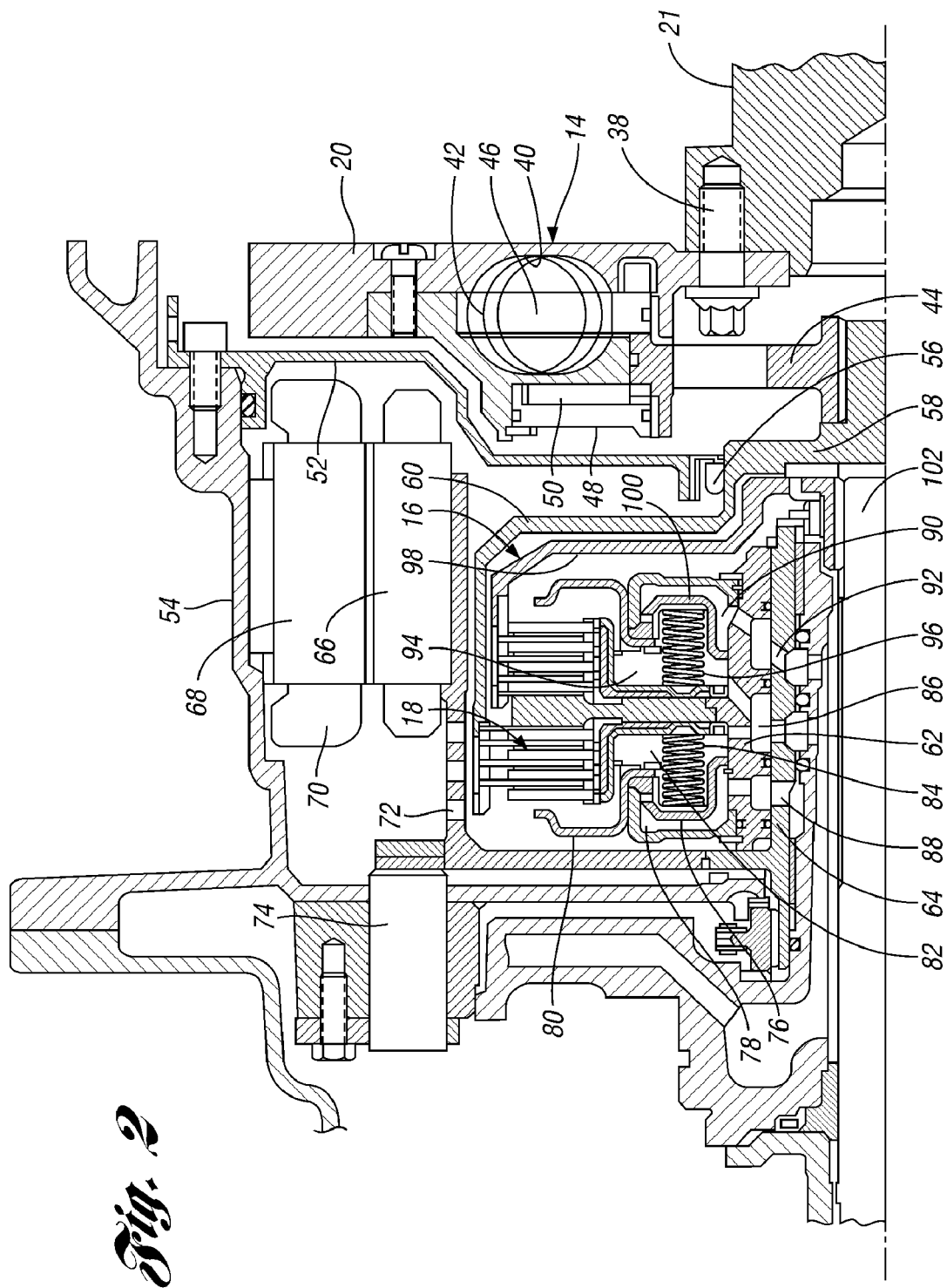
FIG. 2 is a cross-sectional view of a motor and clutch assembly corresponding to the schematic drawing of FIG. 1.

FIG. 2 is a partial cross-sectional view of an embodiment corresponding to the schematic drawing of FIG. 1. The engine power output shaft 21, which may be the output end of the engine crankshaft, is connected by fasteners 38 to the hub of damper 20. Damper spring pockets, formed in part by recesses 40 in the damper 20, receive damper springs 42. A second damper hub 44 carries radial arms 46 which extend between adjacent springs 42. The damper hub 44 is adjustable rotatably relative to the springs 42, whereby the springs are compressed to effect a spring damping force.

A viscous shear damping torque is established by relatively movable damper plates 48 and 50 in the presence of a viscous shear fluid. A radially disposed clutch cover plate 52 separates the damper and its associated elements from the space occupied by the disconnect clutch 18 and the launch clutch 16. The cover plate 52 is sealed at its outer periphery to clutch housing 54. A seal 56 surrounds hub 58 of clutch member 60, which forms a part of the disconnect clutch 18. Clutches 16 and 18 share a common clutch enclosure in clutch member 60 that encloses a clutch hub 62 rotatably mounted on hub 64 of motor rotor 66 for a high voltage motor. The motor stator 68 surrounds the rotor 66 with an annular air gap between them. The stator windings are generally indicated at 70.

The rotor 66 includes a radially outward cylindrical member 72 in which cooling oil flow passages are formed. A speed sensor 74 is located directly adjacent the member 72 to provide a rotor speed indication.

Friction clutch disks for the disconnect clutch 18 are carried by member 60. Clutch separator plates are carried by clutch element 62.

An annular cylinder 78 is defined by a cylindrical member carried by the clutch hub 62. The piston 76 and cylinder 78 carried by the hub 62 define a pressure cavity that, when pressurized, will cause a radial extension 80 of the piston 76 to engage the friction disk and friction plate assembly for the disconnect clutch 18. The piston 76 also defines a pressure balance chamber 82, which contains lubrication fluid that counteracts a centrifugal pressure buildup in the chamber 78.

A piston return spring is shown at 84. Lubrication oil is supplied to the pressure balance chamber 82 through lube oil passages, shown in part at 86. Pressure is applied to cylinder 78 through pressure distributor passages, shown in part at 88.

The launch clutch 16 likewise has a pressure chamber, shown at 90, defined by an annular cylinder carried by clutch member 62. It is supplied with pressurized fluid through pressure passages, shown in part at 92. Lubrication fluid in a pressure balance chamber 94 compensates for a centrifugal pressure buildup in the chamber 90. A piston return spring for the launch clutch is shown at 96. Lube oil passages, shown in part at 86, communicate also with the pressure balance chamber 94.

Friction clutch disks for the launch clutch are carried by clutch member 98, and clutch separator plates for the launch clutch 16 are carried by clutch hub 62. When pressure chamber 90 is pressurized, annular piston 100, which defines in part the pressure chamber 90, frictionally engages the friction disks of the launch clutch 16.

The clutch member at 98 is splined or otherwise drivably connected to transmission input shaft 102.

The closed loop proportional controller of the invention is schematically illustrated in FIG. 3. Transmission oil temperature, which can be measured with a temperature sensor in a transmission oil reservoir, or at any other suitable point in the fluid circuit, is indicated at 104. This corresponds to signal 24 in the schematic drawing of FIG. 1.

The speed of the transmission input shaft is a value that can be measured with a transmission input shaft speed sensor. The speed of the launch clutch output element can be measured by the rotor speed sensor, shown at 74. By comparing these speed values, a launch clutch slip speed can be determined, as shown at 106. By using a calibrated table 108, the desired temperature for a given slip speed can be determined for each transmission oil temperature value. The output of the table 108 is the desired temperature at 110. That value is compared at 112 to a measured motor temperature value at 114. This measured motor temperature value is obtained by a thermistor, not shown, that may be located within the stator windings 70 for the stator 68.

The error between the desired motor temperature at 110 and the measured motor temperature at 114 is input to a gain element 116 with a calibrated gain $k_c$, which converts the temperature error signal into a pressure signal at 120. That pressure signal is received by a compensator, such as a proportional, integral, derivative (PID) control, shown at 122. Compensators other than a PID control also could be used depending on a design choice.

To obtain an accurate indication of pressure at this point, it is necessary to take into account heat generating clutch losses. This is accomplished by first determining a clutch torque using a calibrated relationship between torque and pressure, as indicated at 124. As clutch pressure increases, the torque output increases in a generally linear fashion. The input to the controller, where the torque and pressure information is stored in ROM memory, is a commanded or actual clutch pressure, as shown at 126. The clutch torque, which is determined as shown at 128, is multiplied by the launch clutch slip speed at 130, as shown at 132. The slip speed, as previously described, is a measured value. The result of the multiplication at 132 is a launch clutch power loss, as shown at 134.

To obtain a total power loss at 136, it is necessary to determine motor efficiency loss. This is done using the calibrated table information, shown at 138, which also is stored in the controller ROM memory.

Using motor torque and motor speed as input information, the controller will determine at 138 a motor power loss for any given motor speed. The power loss at 140 is added to the launch clutch power loss at 134 to produce a total power loss at 136. This information is used by the controller as a feed forward term to improve cooling fluid flow control.

The total power loss at 136 is received by a gain element with a gain of $k_x$, which converts total power loss to a pressure. This is indicated at 142. The output of the gain element is a pressure at 144, which is added to the PID controlled pressure at 146.

As indicated previously, the motor speed is obtained using a speed sensor, and the torque operating point at 138 is determined by observing the command to the motor controller. The calibrated power loss plot at 138 is a calibrated plot that estimates the motor power loss as a function of current speed and torque.

When the total power loss is multiplied by the gain $k_x$, the power loss is converted to a pressure signal which, when added to the closed loop pressure term at 146, results in a desired pressure for a linear, variable-force solenoid. The variable force solenoid has a transfer function element, as shown at 148, which converts the pressure to a current that is used by the solenoid to control a flow regulating valve. The resulting pressure will be proportional to the desired cooling fluid flow rate to the launch clutch 16 and the motor.

The pressure value for the transfer function at 148 is transmitted through a switch 150. This switch is used if an unusual condition should arise where the motor temperature is very high ($t_{motor}$>T_CAL_MAX). The switch then would force the system to deliver maximum flow by overriding the closed loop pressure signal with a calibrated signal that represents maximum pressure. The output of the switch is fed to the VFS transfer function element 148, which converts the pressure signal to a desired solenoid current. That current is transferred to an electrohydraulic control system where the output of the solenoid acts on a flow regulator valve such that the cooling flow is directly proportional to the pressure output of the solenoid.

FIG. 4 shows an example of the operation of the circuit of FIG. 3. As shown in FIG. 4, the solenoid pressure increases to meet the increasing flow requirements if the motor temperature should increase. The solenoid pressure decreases when additional flow is no longer required. A transmission oil temperature, which is a measured value, is shown in FIG. 4 at 152. Initially, the motor temperature, shown at 154, is below the transmission oil temperature value. If the motor temperature, shown at 156, should increase to a value greater than the transmission oil temperature, the solenoid pressure will increase, as shown at 158. This produces greater flow and results in a decrease in the motor temperature, as shown at 160. The greater flow has the same effect on transmission oil temperature. The solenoid pressure then is decreased, as shown at 162, since the flow required to maintain a temperature is reduced.

When motor temperature 156 reaches a maximum value at 164 and begins to exceed the maximum value, variable force solenoid pressure sharply increases, as shown at 165, until it reaches a calibrated maximum at 166. The solenoid pressure then remains at the maximum value 166 as the motor temperature decreases. When the motor temperature returns to the maximum value at 164, the solenoid pressure returns to its original value before the increase at 165. The effect of variable force solenoid pressure on oil temperature is similar to its effect on motor temperature.

If the motor temperature for some reason should increase beyond a calibrated threshold (T_CAL_MAX), as shown at 164, the switch will be activated, thereby causing maximum flow and maximum pressure, as shown at 166.

Although an embodiment of the invention has been described, it will be apparent to persons skilled in the art that modifications may be made without departing from the scope of the invention. All such modifications and equivalents thereof are intended to be covered by the following claims.

What is claimed:

1. A method for controlling rate of flow of cooling oil for a pressure-actuated friction clutch in a torque delivery path for a transmission in a powertrain for an engine-driven vehicle, the method comprising the steps of:
   measuring cooling oil temperature;
   measuring friction clutch slip speed;
   determining desired cooling oil temperature as a function of the slip speed for a given value of measured cooling oil temperature;
   converting the desired cooling oil temperature to a first cooling oil pressure;
   developing the clutch pressure;
   converting the clutch pressure to the clutch torque;
   multiplying clutch torque and clutch slip speed to obtain a clutch power loss;
   converting the clutch power loss to a second cooling oil pressure;
   combining the first and second cooling oil pressures to obtain a total cooling oil pressure; and
   converting the total cooling oil pressure to an electrical current for a cooling oil flow control valve whereby the cooling oil flow rate is increased when the cooling oil temperature is increased and is decreased when the cooling oil temperature is decreased.

2. The method set forth in claim 1 wherein the step of converting the desired cooling oil temperature to a first cooling oil pressure includes the step of modifying the first cooling oil pressure using a compensator with at least one of multiple compensator characteristics including proportional, integral and derivative characteristics.

3. The method set forth in claim 1 wherein the step of converting clutch pressure to clutch torque comprises the step of computing the clutch torque as a function of the clutch pressure using a calibrated relationship of the clutch torque and the clutch pressure.

4. The method set forth in claim 1 wherein the step of determining desired cooling oil temperature includes obtaining a stored memory value of the cooling oil temperature from a calibrated relationship of the clutch slip speed and the desired cooling oil temperature wherein the calibrated relationship is variable depending upon the magnitude of the measured cooling oil temperature.

5. A method for controlling rate of flow of cooling oil for a pressure actuated friction clutch and an electric motor in a torque delivery path for a transmission in a powertrain for an engine-driven vehicle whereby electric motor power complements engine power, the electric motor and the friction clutch being disposed in a common cooling oil flow path, the method comprising the steps of:
measuring cooling oil temperature;
measuring friction clutch slip speed;
determining desired cooling oil temperature as a function of the slip speed for a given value of the measured cooling oil temperature;
converting the desired cooling oil temperature to a first cooling oil pressure;
developing clutch pressure;
converting the clutch pressure to clutch torque;
multiplying the clutch torque and the clutch slip speed to obtain a clutch power loss;
measuring motor speed;
determining a commanded motor torque;
determining motor power loss as a calibrated function of motor torque for a given measured motor speed;
combining the clutch power loss and the motor power loss to obtain a total power loss;
converting the total power loss to a second cooling oil pressure;
combining the first and second cooling oil pressures to obtain a total cooling oil pressure; and
converting the total cooling oil pressure to an electrical current for a cooling oil flow control solenoid valve whereby the cooling oil flow rate is increased when the cooling oil temperature is increased and is decreased when the cooling oil temperature is decreased.

6. The method set forth in claim 5 wherein the step of converting the desired cooling oil temperature to a first cooling oil pressure includes the step of modifying the first cooling oil pressure using a compensator with at least one of multiple compensator characteristics including proportional, integral and derivative characteristics.

7. The method set forth in claim 5 wherein the step of converting clutch pressure to clutch torque comprises the step of computing the clutch torque as a function of the clutch pressure in a calibrated relationship of the clutch torque and the clutch pressure.

8. The method set forth in claim 5 wherein the step of determining desired cooling oil temperature includes using a calibrated relationship of the clutch slip speed and the desired cooling oil temperature wherein the calibrated relationship is variable depending upon the magnitude of the measured cooling oil temperature.

9. The method set forth in claim 5 including the steps of measuring motor temperature;
combining the measured motor temperature with the desired cooling oil temperature; and
overriding the cooling oil flow rate determined by combining oil pressures and substituting a maximum cooling oil flow rate when the measured motor temperature exceeds a calibrated maximum value.

10. The method set forth in claim 5 including the steps of measuring motor temperature; and
combining the measured motor temperature with the desired cooling oil temperature;
the cooling oil temperature that is converted to the first cooling oil pressure including both the desired cooling oil temperature and the measured motor temperature.

11. The method set forth in claim 10 wherein the step of converting the desired cooling oil temperature to a first cooling oil pressure includes the step of modifying the first cooling oil pressure using a compensator with proportional, integral and derivative characteristics.

12. The method set forth in claim 10 wherein the step of converting the clutch pressure to clutch torque comprises the step of computing the clutch torque as a function of the clutch pressure in a calibrated relationship of the clutch torque and the clutch pressure.

13. The method set forth in claim 10 wherein the step of determining desired cooling oil temperature includes the steps of obtaining a stored memory value of the cooling oil temperature from a calibrated relationship of the clutch slip speed and the desired cooling oil temperature wherein the calibrated relationship is variable depending upon the magnitude of the measured cooling oil temperature.

14. The method set forth in claim 11 wherein the clutch pressure used in the step of converting the clutch pressure to clutch torque is a commanded clutch pressure.

15. The method set forth in claim 10 wherein the clutch pressure used in the step of converting the clutch pressure to clutch torque is actual clutch pressure.

16. The method set forth in claim 10 including the step of overriding the cooling oil flow rate determined by combining the first and second cooling oil pressures and substituting a maximum cooling oil flow rate when the measured motor temperature exceeds a calibrated maximum value.

17. The method set forth in claim 11 including the step of overriding the cooling oil flow rate determined by combining the first and second cooling oil pressures and substituting a maximum cooling oil flow rate when the measured motor temperature exceeds a calibrated maximum value.

18. The method set forth in claim 12 including the step of overriding the cooling oil flow rate determined by combining the first and second cooling oil pressures and substituting a maximum cooling oil flow rate when the measured motor temperature exceeds a calibrated maximum value.

19. The method set forth in claim 13 including the step of overriding the cooling oil flow rate determined by combining the first and second cooling oil pressures and substituting a maximum cooling oil flow rate when the measured motor temperature exceeds a calibrated maximum value.

* * * * *